(12) United States Patent
Kim et al.

(10) Patent No.: US 10,482,237 B2
(45) Date of Patent: Nov. 19, 2019

(54) METHOD FOR PROCESSING SECURITY OF APPLICATION AND ELECTRONIC DEVICE SUPPORTING THE SAME

(71) Applicant: Samsung Electronics Co., Ltd., Suwon-si, Gyeonggi-do (KR)

(72) Inventors: Hyung Deuk Kim, Suwon-si (KR); Bum Taek Lim, Yongin-si (KR); Yu Jin Jung, Suwon-si (KR); Sang Youl Ha, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/661,534

(22) Filed: Jul. 27, 2017

(65) Prior Publication Data

US 2018/0032719 A1 Feb. 1, 2018

(30) Foreign Application Priority Data

Jul. 29, 2016 (KR) .................. 10-2016-0097563

(51) Int. Cl.
*G06F 21/00* (2013.01)
*G06F 21/51* (2013.01)
*G06F 21/44* (2013.01)
*G06F 21/53* (2013.01)

(52) U.S. Cl.
CPC ............ *G06F 21/51* (2013.01); *G06F 21/44* (2013.01); *G06F 21/53* (2013.01); *G06F 2221/033* (2013.01); *G06F 2221/2149* (2013.01)

(58) Field of Classification Search
None
See application file for complete search history.

(56) References Cited

U.S. PATENT DOCUMENTS

| 6,775,536 B1 * | 8/2004 | Geiger | G06F 21/51 |
| | | | 455/410 |
| 6,948,183 B1 * | 9/2005 | Peterka | H04N 7/162 |
| | | | 348/E5.004 |
| 7,594,108 B2 * | 9/2009 | Vaidyanathan | G06F 21/53 |
| | | | 713/157 |

(Continued)

FOREIGN PATENT DOCUMENTS

KR   10-2014-0127124 A   11/2014

OTHER PUBLICATIONS

Android; "Security-Enhanced Linux in Android"; pp. 1-2; Jul. 13, 2017; https://source.android.com/devices/tech/security/selinux/index.html.

(Continued)

*Primary Examiner* — Maung T Lwin
(74) *Attorney, Agent, or Firm* — Jefferson IP Law, LLP

(57) ABSTRACT

An electronic device is provided. The electronic device includes a memory to store an application, a communication interface to communicate with an external device, and a processor operatively connected with the memory and the communication interface. The processor determines whether the application is authenticated if receiving an installation request or an execution request of the application, generates a policy file associated with a domain of the application if the application is authenticated, and assigns the application to a specified domain, which is accessible to a secure area of the memory, based on the generated policy file.

14 Claims, 9 Drawing Sheets

(56) References Cited

U.S. PATENT DOCUMENTS

| | | | |
|---|---|---|---|
| 7,877,791 B2* | 1/2011 | Childress | H04L 63/104 713/168 |
| 7,926,086 B1* | 4/2011 | Violleau | G06F 21/629 713/161 |
| 8,051,459 B2 | 11/2011 | Zhang et al. | |
| 8,156,560 B2* | 4/2012 | Okimoto | G06F 21/10 348/E5.007 |
| 8,874,923 B2* | 10/2014 | Foygel | H04L 63/083 382/276 |
| 8,984,478 B2* | 3/2015 | Epstein | G06F 12/1475 717/110 |
| 2005/0125661 A1* | 6/2005 | Vaidyanathan | G06F 21/53 713/166 |
| 2005/0182958 A1* | 8/2005 | Pham | G06F 21/51 726/22 |
| 2008/0066143 A1* | 3/2008 | Charles Tai | G06F 8/61 726/1 |
| 2008/0066165 A1* | 3/2008 | Rosenoer | G06F 17/30569 726/5 |
| 2008/0184335 A1 | 7/2008 | Zhang et al. | |
| 2009/0276860 A1* | 11/2009 | Miyabashi | G06F 21/6245 726/30 |
| 2010/0274910 A1* | 10/2010 | Ghanaie-Sichanie | H04L 9/3234 709/229 |
| 2012/0185912 A1* | 7/2012 | Lee | H04L 63/10 726/1 |
| 2012/0216242 A1* | 8/2012 | Uner | G06F 21/50 726/1 |
| 2013/0312058 A1* | 11/2013 | Thompson | G06F 21/54 726/1 |
| 2014/0282876 A1* | 9/2014 | Schentrup | H04L 63/10 726/3 |
| 2016/0042191 A1* | 2/2016 | Enck | G06F 21/6218 726/1 |
| 2016/0196432 A1* | 7/2016 | Main | G06F 8/61 726/1 |
| 2016/0205082 A1* | 7/2016 | Puderer | G06F 8/61 713/165 |

OTHER PUBLICATIONS

Stephen Smalley et al.; "Security Enhanced (SE) Android"; pp. 1-49; Trusted Systems Research National Security Agency; Jan. 2012; http://selinuxproject.org/page/SEAndroid.

* cited by examiner

METHOD FOR PROCESSING SECURITY OF APPLICATION AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Jul. 29, 2016 in the Korean Intellectual Property Office and assigned Serial number 10-2016-0097563, the entire disclosure of which is hereby incorporated by reference.

TECHNICAL FIELD

The present disclosure relates to a method for processing security of an application and an electronic device supporting the same.

BACKGROUND

With the development of a computing system, a number of application programs (or applications) driven by an electronic device such as a smartphone have been created. The electronic device may provide an execution environment of an application supporting various functions. For example, the electronic device may control system resources, such as a storage space of a memory or the like, such that the application supporting functions, such as a call function, a camera shooting function, multimedia content playing, a web search function, or the like, is installed and executed.

In the meantime, as a security function such as personal information protection becomes important, the security of applications that use or process data including personal information or confidential information, such as a message, a contact, a photograph, a confidential document, or a schedule, is being strengthened. For example, when installing or executing an application, the electronic device may determine whether the application is authenticated. In addition, the electronic device may set an independent space (or an execution environment), for example, a domain, in which the authenticated application is installed and executed. In this case, the electronic device may refer to a policy file associated with the domain to set the domain. Furthermore, the electronic device may refer to the policy file to grant permission to access a secure area to the application assigned to a specific domain.

An electronic device may obtain a policy file associated with a domain from an authentication server through a method such as firmware over the air (FOTA) or the like, to set a domain of an application obtained (or downloaded) from an external device (e.g., a content providing server) such as a third party application or the like, or to grant the permission to access a secure area to the application assigned to a specific domain. However, it is inconvenient to obtain a policy file from the authentication server and to update the policy file whenever an application is obtained. In addition, system resources are inefficiently used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a method for processing security of an application, which generates a policy file associated with a domain of the application such that the domain of the application is set or permission to access a secure area is granted to the application assigned to a specific domain, based on the generated policy file, when the authenticated application is installed or executed, and an electronic device supporting the same.

In accordance with an aspect of the present disclosure, an electronic device is provided. The electronic device includes a memory configured to store an application, a communication interface configured to communicate with an external device, and at least one processor operatively connected with the memory and the communication interface. The at least one processor is configured to determine whether the application is authenticated, if receiving an installation request or an execution request of the application, generate a policy file associated with a domain of the application if the application is authenticated, and assign the application to a specified domain, which is accessible to a secure area of the memory, based on the generated policy file.

In accordance with another aspect of the present disclosure, a method for processing security of an application is provided. The method includes receiving a request to install or execute the application, determining whether the application is authenticated, generating a policy file associated with a domain of the application if the application is authenticated, and assigning the application to a specified domain accessible to a secure area of a memory, based on the generated policy file.

In accordance with another aspect of the present disclosure, a computer-readable recording medium is provided having recorded thereon instructions that, when executed by at least one processor, configure the at least one processor to perform a method. The method includes receiving a request to install or execute an application, determining whether the application is authenticated, generating a policy file associated with a domain of the application if the application is authenticated, and assigning the application to a specified domain, which is accessible to a secure area of a memory, based on the generated policy file.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
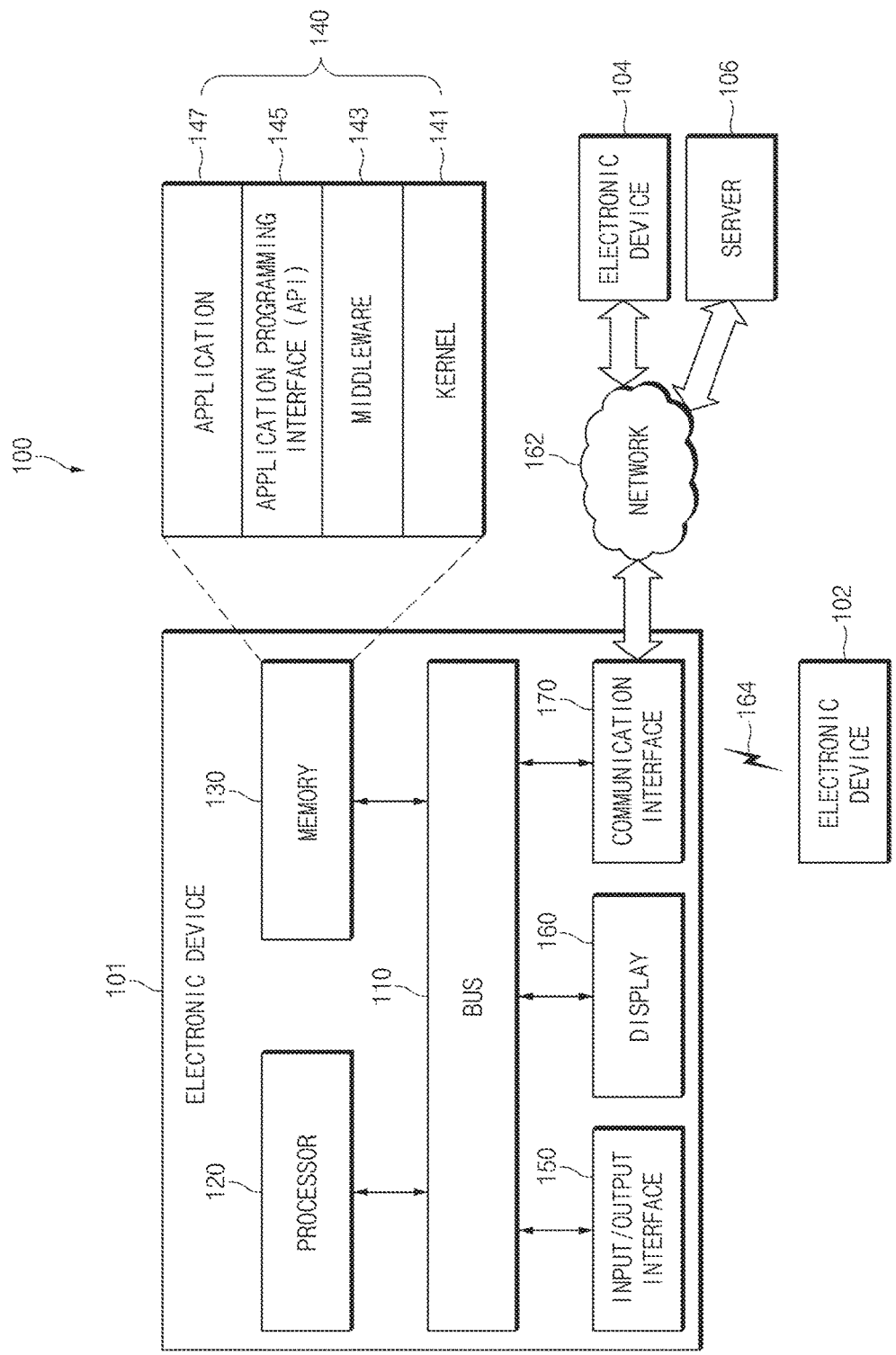
FIG. 1 is a block diagram illustrating an electronic device in a network environment, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements, but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," or the like, used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed with" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital versatile disc (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging device (MRI), a computed tomography device (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram illustrating an electronic device 101 in a network environment 100, according to an embodiment of the present disclosure.

According to various embodiments, when installing or executing an application 147, the electronic device 101 may determine whether the application 147 is authenticated. In addition, the electronic device 101 may set an independent space (or an execution environment), for example, a domain, in which the authenticated application 147 is installed and executed. In this case, the electronic device 101 may refer to a policy file associated with the domain to set the domain. Furthermore, the electronic device 101 may refer to the policy file to grant permission to access a secure area to the application 147 assigned to a specific domain.

According to an embodiment, to set a domain of the application 147 obtained (or downloaded) from an external device (e.g., a first external electronic device 102, a second external electronic device 104, or a server 106) such as a third party application or the like, or to assign the application 147 to the specific domain accessible to the secure area, the electronic device 101 may generate the policy file associated with the domain of the application 147, and then the electronic device 101 may set the domain of the application 147 or may assign the application 147 to the specific domain, based on the generated policy file. Accordingly, the electronic device 101 may grant permission to access the secure area to the application 147.

Referring to FIG. 1, the electronic device 101 supporting the above-described function may be interconnected with an external device (e.g., the first external electronic device 102, the second external electronic device 104, or the server 106) over a network 162 or a local wireless communication 164. The electronic device 101 may include a bus 110, a processor 120, a memory 130, an input/output (I/O) interface 150, a display 160, and a communication interface 170. In any embodiment, the electronic device 101 may not include at least one of the above-described elements or may further include any other element(s).

The bus 110 may include a circuit for connecting the above-mentioned elements 120 to 170 to each other and transferring communications (e.g., control messages and/or data) among the above-mentioned elements.

The processor 120 may include at least one of a CPU, an AP, or a CP. The processor 120 may perform data processing or an operation related to communication and/or control of at least one of the other elements of the electronic device 101.

In the case where the processor 120 drives an android operating system (OS), the processor 120 may process the application 147 and an operation such as a resource, an arithmetic operation, or the like, that the application 147 uses, based on a policy established by specified rules or requirements. However, an example associated with the android OS that is described above or is to be described below is simply an example, and the processor 120 according to various embodiments of the present invention may perform the same or similar functions in the case where the processor 120 drives another OS. For example, even though the processor 120 drives another OS in addition to the android OS, the processor 120 may control an operation of the application 147 based on the policy.

For example, the processor 120 may allow the application 147 to be installed or executed in only an independent execution environment (e.g., a domain). For example, the processor 120 may make it possible to access an execution code of the application 147, data that the application 147 uses, or the like, only in a specified domain. In this case, the processor 120 may control access to the domain such that a user, a module, or the like, that receives permission by the policy shares communication or data with the application 147 in the domain.

In this regard, the policy may be stored in the memory 130 in a specified format. For example, the policy may be defined in a policy file in a text format, and the policy file may be stored in the memory 130. For example, the policy file may be defined such that specified identification information (e.g., a tag) is assigned to the application 147 based on signature information, package information (e.g., a package name) of the application 147, or the like. For example, the policy file may include a "mac_permissions.xml" file that is defined such that the application 147 is assigned to a specific domain based on a "seinfo" tag on the base of the android OS. According to an embodiment, the identification information may be assigned to metadata of the application 147. For example, a "DDC" tag may be assigned to an "AndroidManifest.xml" file of the application 147 on the basis of the android OS. However, a name of the tag is not limited to "DDC".

According to an embodiment, the processor 120 may verify the policy file, and then the processor 120 may set a domain of the application 147 or may assign the application 147 to a specific domain accessible to a secure area, by using the identification information assigned based on signature information and package information of the application 147. For example, the processor 120 may determine whether the "DDC" tag is assigned to an "AndroidManifest.xml" file of the application 147, on the basis of the android OS, and the processor 120 may set the domain of the application 147 or may assign the application 147 to the specific domain accessible to the secure area, based on information set in the "DDC" tag.

According to an embodiment, the processor 120 may generate a new policy file associated with the domain of the application 147. The processor 120 may generate the policy file associated with the domain of the application 147 authenticated by an authentication server (e.g., the server 106). For example, the processor 120 may generate a "mac_permissions.xml" file on the basis of the android OS. It is understood by those skilled in the art that a file name of the new policy file is not limited to the "mac_permissions.xml". The new policy file may include specified identification information assigned based on signature information, package information, or the like, of the authenticated application 147. For another example, the processor 120 may store the generated new policy file in the memory 130. Preferably, the generated new policy file may be stored at a location which is different from a location where there is an existing policy file, on the memory 130.

According to an embodiment, the processor 120 may set the domain of the application 147 or may assign the application 147 to the specific domain accessible to the secure area, based on the generated new policy file. The processor 120 may set the domain of the application 147 or may assign the application 147 to the specific domain accessible to the secure area, by using the generated new policy file together with the policy file stored in the memory 130 in advance.

According to an embodiment, when deleting the application 147, the processor 120 may release the domain of the application 147 or may release permission to access the secure area. According to an embodiment, when deleting the application 147, the processor 120 may delete the new policy file in the memory 130.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or the application program (or an application) 147. At least a portion of the kernel 141, the middleware 143, or the API 145, may be referred to as an OS of the electronic device 101.

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147, to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

According to an embodiment, the memory 130 may store the policy file generated by default. In addition, the memory 130 may store the new policy file generated when the authenticated application 147 is installed or executed.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., the first external electronic device 102, the second external electronic device 104, or the server 106). For example, the communication interface 170 may be connected to the network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, the short-range communications 164. The short-range communications may include at least one of wireless fidelity (Wi-Fi), Bluetooth (BT), near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a POS (point of sales) device. The POS device may detect the magnetic signals by using an MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of a universal serial bus (USB), a high definition multimedia interface (HDMI), a recommended standard 232 (RS-232), a plain old telephone service (POTS), or the like. The network 162 may include at least one of a telecommunications network, for example, a computer network (e.g., local area network (LAN) or wide area network (WAN)), the Internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
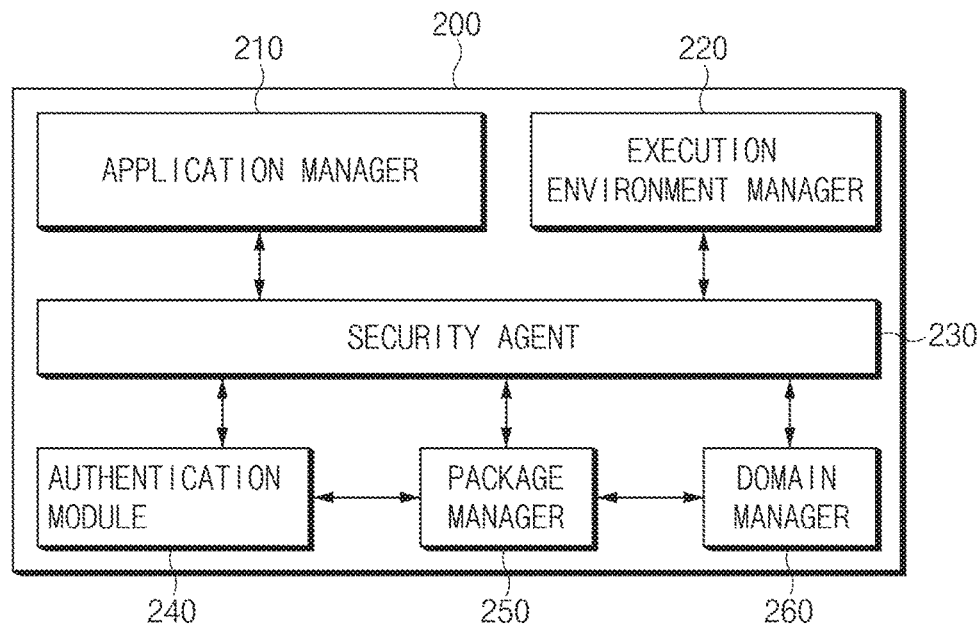
FIG. 2 is a block diagram illustrating a configuration of an electronic device associated with security processing, according to an embodiment of the present disclosure.

FIG. 2 is a block diagram illustrating a configuration of an electronic device associated with security processing, according to an embodiment of the present disclosure.

Referring to FIG. 2, a processor 200 may include an application manager 210, an execution environment manager 220, a security agent 230, an authentication module 240, a package manager 250, and a domain manager 260. A configuration of the processor 200 is illustrated as only the configuration associated with the security processing. However, the configuration of the processor 200 is not limited thereto.

Furthermore, the application manager 210, the execution environment manager 220, the security agent 230, the authentication module 240, the package manager 250, and the domain manager 260 are described in FIG. 2 as being included in the processor 200. However, this is for convenience of description. At least one of the application manager 210, the execution environment manager 220, the security agent 230, the authentication module 240, the package manager 250, and the domain manager 260 may be substantially implemented with instructions stored on a memory (e.g., the memory 130). The processor 200 may perform a function of an element corresponding to the instructions by executing the instructions.

The application manager 210 may manage a life cycle of an application (e.g., the application 147). For example, when a function such as installation, execution, deletion, or the like, of the application is performed, the application manager 210 may process an instruction and data that are related to the function.

The execution environment manager 220 may manage an execution environment. For example, the execution environment manager 220 may manage a security execution environment (e.g., trusted execution environments (TEE)). The execution environment manager 220 may designate a normal area and a secure area, and may set a domain in at least one of the normal area and the secure area. For example, the execution environment manager 220 may designate the normal area and the secure area on the memory and may set at least a part of the normal area and the secure area to the domain.

The security agent 230 may perform processing associated with security of the application. For example, when the application is installed or executed, the security agent 230 may make a request for version information of the security execution environment to the execution environment manager 220. For another example, to determine whether the application is authenticated, the security agent 230 may transmit signature information, package information, or the like, of the application to the authentication module 240. For another example, to set a domain of the application or to assign the application to a specific domain accessible to the secure area, the security agent 230 may transmit the relevant instruction and data to the domain manager 260. According to an embodiment, when the application is deleted, the security agent 230 may transmit the relevant instruction and data to the domain manager 260 to release the domain of the application or to release permission to access the secure area.

The authentication module 240 may determine whether the application is authenticated. For example, the authentication module 240 may determine whether the application is the authenticated application by using the signature information, the package information, or the like, of the application. According to an embodiment, the authentication module 240 may determine whether the application is the authenticated application by determining whether specified identification information is present (or assigned) in metadata of the application.

The package manager 250 may install or update an application which is distributed in the form of a package file. For example, in the case where the application is distributed in the form of the package, the package manager 250 may separate execution code and data of the application included in a package by parsing the package. According to an embodiment, the package manager 250 may change identification information of the application distributed in the form of the package in response to a request of the domain manager 260. For example, the package manager 250 may change information set in a "DDC" tag assigned to an "AndroidManifest.xml" file of an application included in the package, on the basis of an android OS.

The domain manager 260 may set or release the domain of the application. For example, the domain manager 260 may set the domain, in which the application is installed or executed, on the memory. For another example, the domain manager 260 may release the domain set on the memory. In addition, the domain manager 260 may assign or release the application to or from a specific domain accessible to a secure area.

According to an embodiment, the domain manager 260 may determine whether a domain having an identifier (e.g., ID) the same as an identifier of the domain of the application is set. In the case where the domain is set in advance, the domain manager 260 may assign an execution code of the application, data that the application uses, or the like, to the domain set in advance. In the case where the domain is not set, the domain manager 260 may set a new domain by using the identifier of the domain of the application.

According to an embodiment, the domain manager 260 may generate a new policy file associated with the domain of the application. Furthermore, if the domain of the application is set, the domain manager 260 may interrupt access of another application that is not included in the domain, another module that is not included in the domain, or the like. For example, the domain manager 260 may control access to the domain such that a user, a module, or the like, that receives permission by the policy shares communication or data with the application in the domain.

As described above, according to various embodiments, an electronic device (e.g., the electronic device 101) may include a memory (e.g., the memory 130) configured to store an application, a communication interface (e.g., the communication interface 170) configured to communicate with an external device, and a processor (e.g., the processor 120) operatively connected with the memory and the communication interface. The processor may be configured to determine whether the application is authenticated if receiving an installation request or an execution request of the application, generate a policy file associated with a domain of the application if the application is authenticated, and assign the application to a specified domain, which is accessible to a secure area of the memory, based on the generated policy file.

According to various embodiments, the processor may be configured to determine whether the application is authenticated based on authentication information of the application included in metadata of the application.

According to various embodiments, the authentication information of the application may be obtained from an authentication server when the application is created.

According to various embodiments, the processor may be configured to determine whether specified identification information is present in metadata of the application if the application is authenticated, and generate the policy file associated with the specified domain based on the specified identification information if the specified identification information is present.

According to various embodiments, the policy file may include the specified identification information assigned based on at least one of signature information and package information of the application.

According to various embodiments, the processor may be further configured to store the generated policy file in the memory.

According to various embodiments, the processor may be further configured to allow at least one of an execution code of the application and data that the application uses to be shared with only another application in the specified domain.

According to various embodiments, the processor may be further configured to assign at least one of an execution code of the application and data that the application uses, to the specified domain.

According to various embodiments, the processor may be further configured to release the application from the specified domain if receiving a request to delete the application.

According to various embodiments, the processor may be further configured to delete information of the application from the generated policy file if receiving a request to delete the application.

Figure 3:
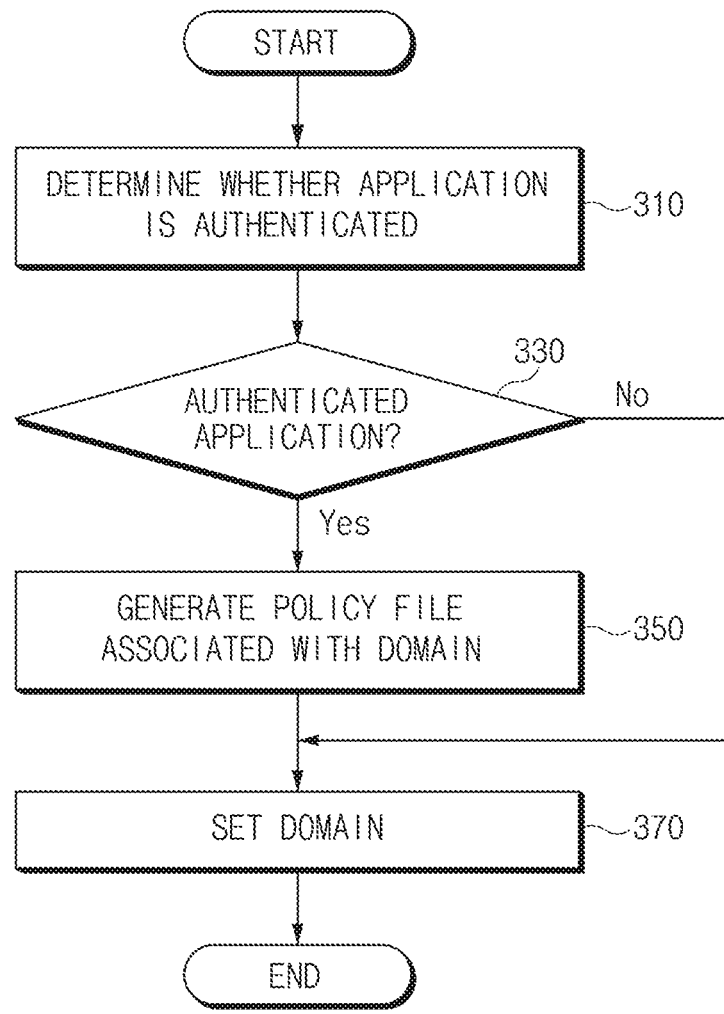
FIG. 3 is a flowchart illustrating a method of operating an electronic device associated with security processing, according to an embodiment of the present disclosure.

FIG. 3 is a flowchart illustrating a method of operating an electronic device associated with security processing, according to an embodiment of the present disclosure.

Referring to FIG. 3, in operation 310, an electronic device (e.g., the electronic device 101) may determine whether an application is authenticated. According to an embodiment, the electronic device may analyze metadata of the application and may determine whether the application is authenticated by verifying information associated with authentication included in the metadata. According to an embodiment, the electronic device may obtain the information associated with the authentication of the application from an authentication server. For example, when downloading the application from a content providing server, the electronic device may obtain the information associated with the authentication of the application together with the application. In this case, the content providing server may obtain the information associated with the authentication of the application from the authentication server and may transmit the information associated with the authentication to the electronic device together with the application.

In operation 330, the electronic device may determine whether the application is the authenticated application by using the information associated with the authentication of the application. In the case where the application is the authenticated application, in operation 350, the electronic device may generate a policy file associated with the domain of the application.

In operation 370, the electronic device may set the domain of the application. For example, the electronic device may set the domain of the application based on the policy file that is present in advance (e.g., stored in advance in a memory of the electronic device). For example, the electronic device may set a partial area on the memory to the domain of the application. According to an embodiment, the domain of the application may be a specific domain accessible to a secure area based on the policy file that is present in advance.

Figure 4:
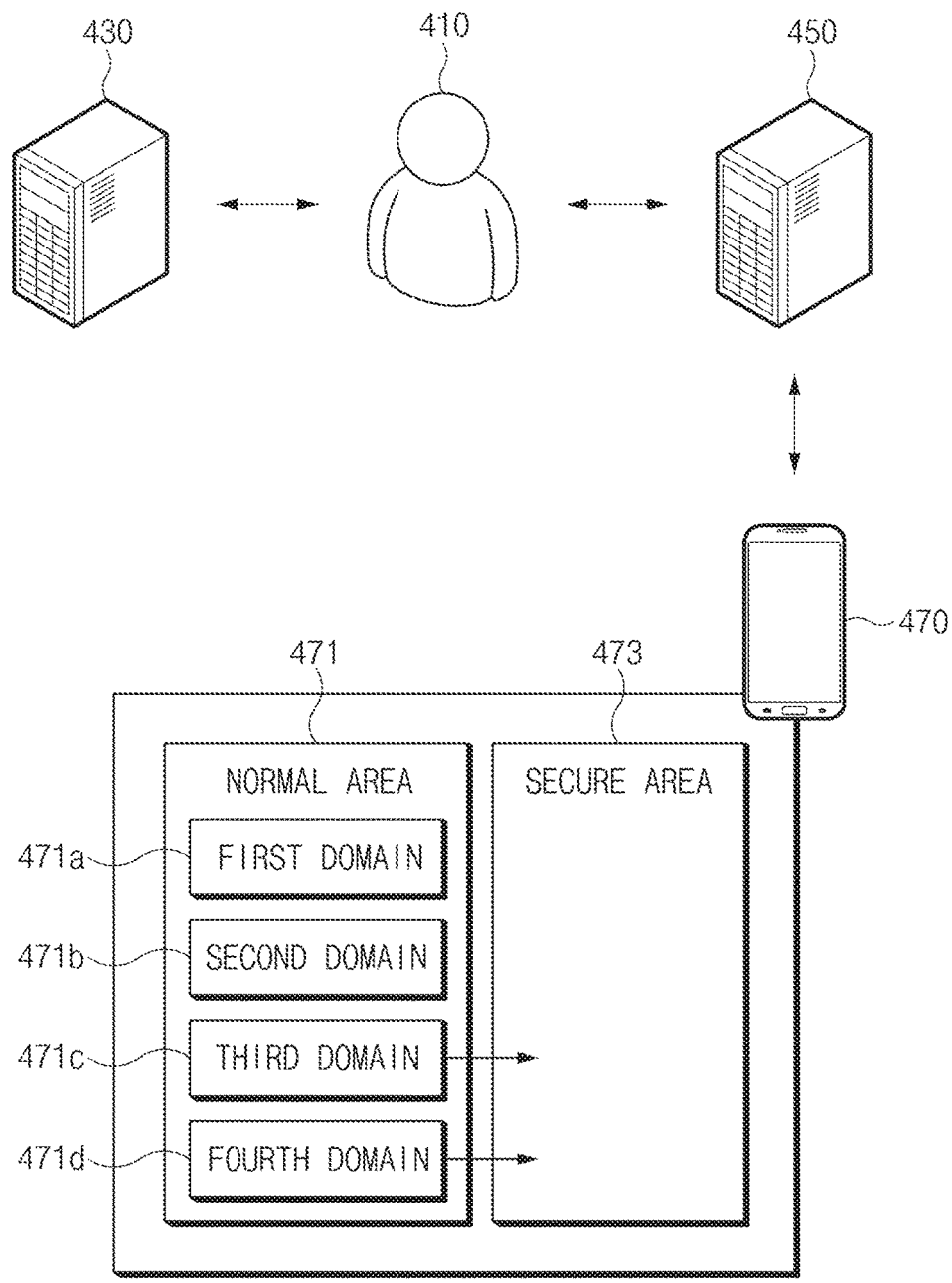
FIG. 4 is a diagram for describing authentication of an application, setting of a domain, or granting of permission to access a secure area, according to an embodiment of the present disclosure.

FIG. 4 is a diagram for describing authentication of an application, setting of a domain, or granting of permission to access a secure area, according to an embodiment of the present disclosure.

Referring to FIG. 4, a content provider 410 (e.g., a programmer or the like creating an application) may receive authentication of an application through an authentication server 430. For example, the content provider 410 may transmit information of the application (e.g., an application name, a package name of an application, information about an authentication key, or the like) to the authentication server 430, and the authentication server 430 may transmit information associated with the authentication of the application (or authentication information) to the content provider 410 by using the information of the application.

When creating the application, the content provider 410 may include authentication information of the application received from the authentication server 430 in the application. For example, the content provider 410 may include the authentication information in metadata (e.g., "AndroidManifest.xml" file) of the application. Afterwards, if the content provider 410 registers the application in a content providing server 450 such as a market or the like, an electronic device 470 may download the application from the content providing server 450.

The electronic device 470 may install and execute the downloaded application. According to an embodiment, the electronic device 470 may store the application in a memory. According to an embodiment, in the case where the application is distributed in the package form, the electronic device 470 may parse the package, may divide an execution code and data of the application included in the package, and may store each of the execution code and the data in a memory.

Moreover, the electronic device 470 may determine whether the application is authenticated. For example, the electronic device 470 may analyze the metadata of the application and may determine whether authentication information of the application is included in the metadata.

If it is determined that the application is the authenticated application, the electronic device 470 may determine whether specified identification information (e.g., "DDC" tag) is present in the metadata of the application. In the case where the specified identification information is present, the electronic device 470 may generate a policy file associated with a domain of the application or may assign the application to a specific domain accessible to a secure area, based on the specified identification information. The generated policy file may include the specified identification information assigned based on signature information, package information, or the like, of the authenticated application.

According to an embodiment, the electronic device 470 may store the generated policy file in a memory together with a policy file stored in advance. According to an embodiment, the electronic device 470 may store the policy file stored in advance and the generated policy file at different locations on the memory, respectively. In addition, the electronic device 470 may set the domain of the application or may assign the application to the specific domain accessible to the secure area, based on the generated policy file and the policy file stored in advance.

According to an embodiment, the electronic device 470 may designate a normal area 471 and a secure area 473 (or a container) on the memory. Data that is not required for security processing or an installation-requested application may be assigned (stored) in the normal area 471. An application stored in the normal area 471 may share an execution code and data with another application stored in the memory. Data required for security processing may be assigned (or stored) in the secure area 473. For example, data stored in the secure area 473 may be shared with only the application assigned to a specific domain accessible to the secure area 473.

According to an embodiment, the electronic device 470 may set a domain to the normal area 471. For example, the electronic device 470 may set a first domain 471a, a second domain 471b, a third domain 471c, and a fourth domain 471d to the normal area 471. However, the number of domains and an area in which a domain is set are not limited thereto. According to various embodiments, at least one of the above-described domains may be omitted, and at least one other domain(s) may be further set.

According to an embodiment, a part of a domain (e.g., the third domain 471c or the fourth domain 471d) of domains set in the normal area 471 may be allowed to access the secure area 473. Furthermore, the authenticated application may be assigned to a domain (e.g., the third domain 471c or the fourth domain 471d) allowed to access the secure area 473. As such, the authenticated application assigned to the domain (e.g., the third domain 471c or the fourth domain 471d) allowed to access the secure area 473 may use data assigned to (or stored in) the secure area 473. According to another embodiment, another part of a domain (e.g., the first domain 471a or the second domain 471b) of domains set in the normal area 471 may not be allowed to access the secure area 473. Moreover, an application that is not authenticated may be assigned to the domain (e.g., the first domain 471a or the second domain 471b) that is not allowed to access the secure area 473.

Figure 5:
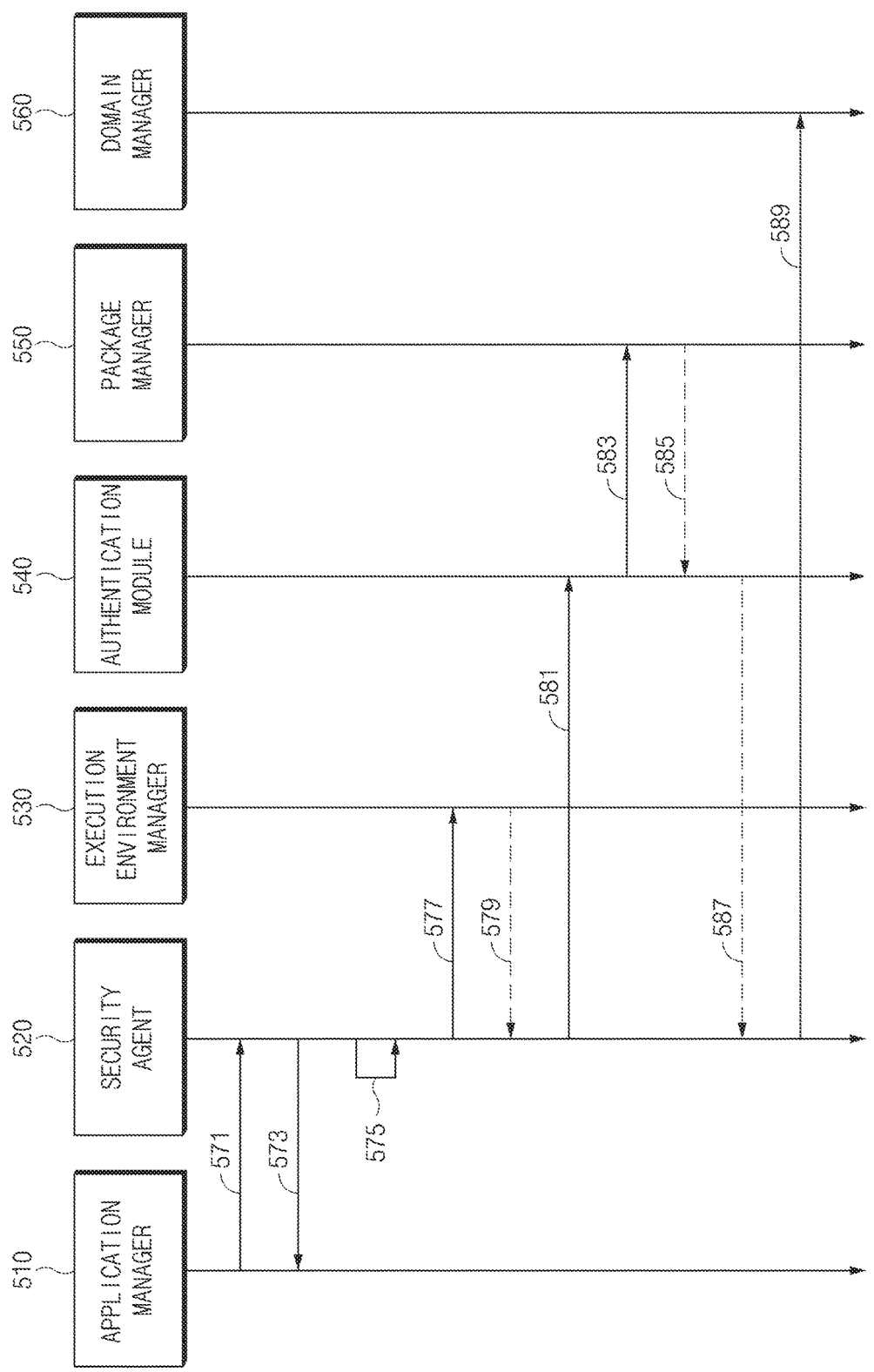
FIG. 5 is a diagram for describing an authenticating method of an application according to installation or execution of the application, according to various embodiments of the present disclosure.

FIG. 5 is a diagram for describing an authenticating method of an application according to installation or execution of the application, according to various embodiments.

Referring to FIG. 5, if receiving a request to install or execute the application, in operation 571, an application manager 510 may notify a security agent 520 of the request to install or execute the application. If receiving the request to install or execute the application, in operation 573, the security agent 520 may make a request for information (e.g., metadata of the application, or the like) of the application to the application manager 510.

If obtaining the information of the application from the application manager 510, in operation 575, the security agent 520 may analyze the information (e.g., metadata of the application, or the like) of the application. According to an embodiment, the security agent 520 may determine whether specified identification information is present in the metadata of the application. Also, the security agent 520 may determine whether authentication information is included in the metadata of the application.

In operation 577, the security agent 520 may make a request for version information of a security execution environment to an execution environment manager 530. In operation 579, the execution environment manager 530 may return the version information of the security execution environment. According to an embodiment, operation 577 and operation 579 may be skipped.

In operation 581, the security agent 520 may make a request for authentication to an authentication module 540 to determine whether the application is authenticated. For example, the security agent 520 may transmit signature information, package information, or the like, of the application to the authentication module 540. In operation 583, the authentication module 540 may make a request for information (e.g., an application name, a package name of an application, authentication key information, or the like) of the application to a package manager 550. In operation 585, the package manager 550 may transmit the information of the application to the authentication module 540. According to an embodiment, in the case where the application is distributed in the form of a package, the package manager 550 may parse the package to extract the information of the application.

In operation 587, the authentication module 540 may determine whether the application is authenticated by using the information of the application and may transmit the determination result to the security agent 520. In the case where the application is the authenticated application, in operation 589, the security agent 520 may request a domain manager 560 to set a domain or to assign the application to a specific domain accessible to a secure area. In this case, the security agent 520 may transmit to the domain manager 560, a relevant instruction and data (e.g., the metadata of the application, or the like) for setting a domain or for assigning the application to a specific domain accessible to a secure area.

Figure 6:
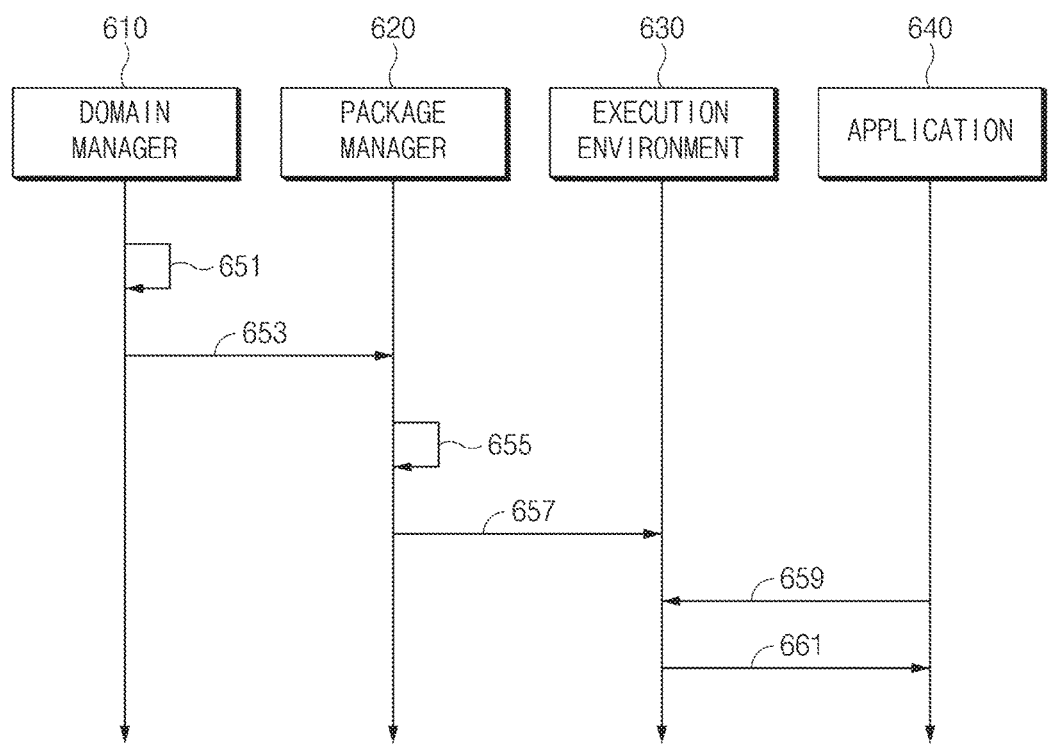
FIG. 6 is a diagram for describing setting of a domain of an application or granting of permission to access a secure area, according to an embodiment of the present disclosure.

FIG. 6 is a diagram for describing setting of a domain of an application or granting of permission to access a secure area, according to an embodiment of the present disclosure.

Referring to FIG. 6, if receiving a request to set a domain of an application 640 or a request to assign the application 640 to a specific domain accessible to a secure area, in operation 651, a domain manager 610 may determine whether specified identification information (e.g., "DDC"

tag) is present in metadata of the application 640. In the case where the specified identification information is present, the domain manager 610 may generate a policy file (e.g., "mac_permissions.xml" file) associated with a domain of the application 640 based on the specified identification information. The generated policy file may include the specified identification information assigned based on signature information, package information, or the like, of the authenticated application 640.

In operation 653, the domain manager 610 may transmit the relevant instruction and data to a package manager 620 such that information of the application 640 is updated. In operation 655, the package manager 620 may change the information of the application 640. For example, the package manager 620 may change identification information (e.g., "seinfo" tag) included in the metadata (e.g., "AndroidManifest.xml" file) of the application 640.

In operation 657, the package manager 620 may assign an execution code and data of the application 640 to an execution environment 630, for example, the domain of the application 640. According to an embodiment, the domain manager 610 may set the domain (e.g., the execution environment 630) of the application 640 or may assign the application 640 to the specific domain accessible to the secure area, based on the changed identification information.

According to an embodiment, the execution environment 630 may be a partial area of a memory. The execution environment 630 may include a normal area and a secure area of the memory. However, preferably, permission is granted such that only the execution code and the data of the authenticated application 640 access the secure area. In addition, the execution environment 630 may include an area corresponding to a domain set in the normal area.

If an execution request of the application 640 is generated in operation 659, in operation 661, the execution code and the data of the application 640 may be assigned to a domain set in the execution environment 630.

According to an embodiment, the domain manager 610 may determine whether a domain having an identifier (e.g., ID) the same as an identifier of the domain of the application 640 is set. In the case where the domain is set in advance, the domain manager 610 may assign the execution code of the application 640, data that the application 640 uses, or the like, to the domain set in advance. In the case where the domain is not set, the domain manager 610 may set a new domain by using the identifier of the domain of the application 640.

Figure 7:
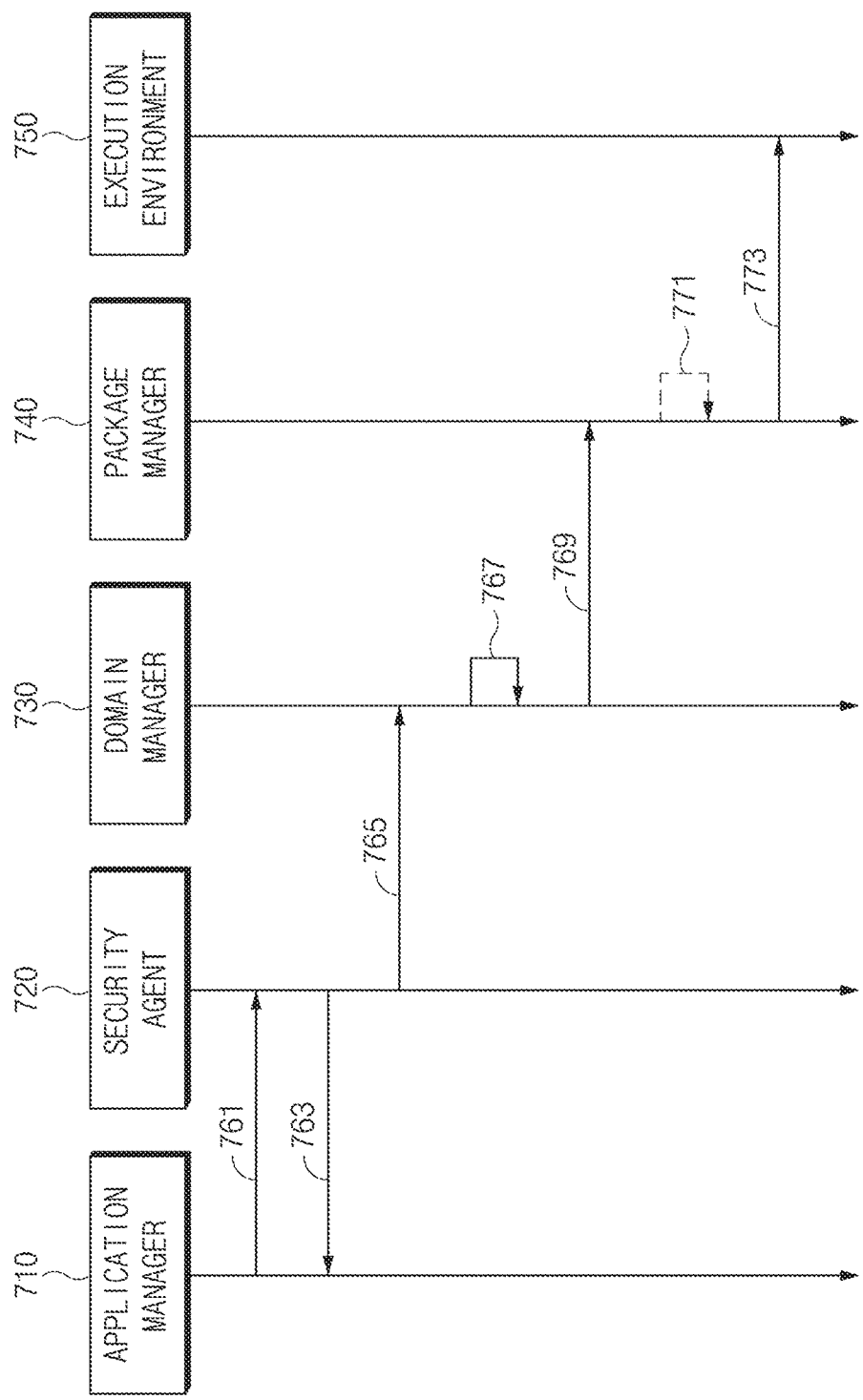
FIG. 7 is a diagram for describing deleting of a domain or releasing of permission to access a secure area, depending on deletion of an application, according to an embodiment of the present disclosure.

FIG. 7 is a diagram for describing deleting of a domain or releasing of permission to access a secure area, depending on deletion of an application, according to an embodiment of the present disclosure.

Referring to FIG. 7, if receiving a request to delete an application, in operation 761, an application manager 710 may notify a security agent 720 of the request to delete the application. If receiving the request to delete the application, in operation 763, the security agent 720 may make a request for information (e.g., metadata of the application, or the like) of the application to the application manager 710.

If obtaining information of the application from the application manager 710, in operation 765, the security agent 720 may make a request for releasing a domain to a domain manager 730 or may make a request for releasing permission to access a secure area to the domain manager 730. In this case, the security agent 720 may transmit, to the domain manager 730, a relevant instruction and data (e.g., metadata of the application, or the like) for releasing the domain of the application or for releasing the permission to access the secure area.

If receiving a request to release the domain of the application or to release the permission to access the secure area, in operation 767, the domain manager 730 may determine whether specified identification information is present in the metadata of the application. If the specified identification information is present, the domain manager 730 may verify the domain of the application based on the specified identification information. According to an embodiment, the domain manager 730 may delete information of the application, which is deletion-requested, from the generated policy file (e.g., "mac_permission.xml" file), which is generated with regard to the domain of the application.

In operation 769, the domain manager 730 may transmit the relevant instruction and data to a package manager 740 such that information of the application is updated. In operation 771, the package manager 740 may change identification information (e.g., "seinfo" tag) included in the metadata (e.g., information of the corresponding application loaded in a memory) of the application.

In operation 773, the package manager 740 make request an execution environment 750 to delete the domain of the application set or to release the permission to access the secure area. In this case, the domain of the application set on memory may be released or the application may be released from the specific domain accessible to the secure area. For example, the domain of the application may be changed into a domain inaccessible to the secure area.

As described above, according to various embodiments, a method for processing security of an application may include receiving a request to install or execute the application, determining whether the application is authenticated, generating a policy file associated with a domain of the application if the application is authenticated, and assigning the application to a specified domain accessible to a secure area of a memory, based on the generated policy file.

According to various embodiments, the determining of whether the application is authenticated may include determining whether the application is authenticated based on authentication information of the application included in metadata of the application.

According to various embodiments, the generating of the policy file may include determining whether specified identification information is present in metadata of the application if the application is authenticated, and generating the policy file associated with the specified domain based on the specified identification information if the specified identification information is present.

According to various embodiments, the generating of the policy file may further include including the specified identification information assigned based on at least one of signature information and package information of the application, in the policy file.

According to various embodiments, the method may further include storing the generated policy file in the memory.

According to various embodiments, the assigning of the application to the specified domain may further include allowing at least one of an execution code of the application and data that the application uses to be shared with only another application in the specified domain.

According to various embodiments, the assigning of the application to the specified domain may include assigning at least one of an execution code of the application and data that the application uses, to the specified domain.

According to various embodiments, the method may further include releasing the application from the specified domain if receiving a request to delete the application.

According to various embodiments, the method may further include deleting information of the application from the generated policy file if receiving a request to delete the application.

Figure 8:
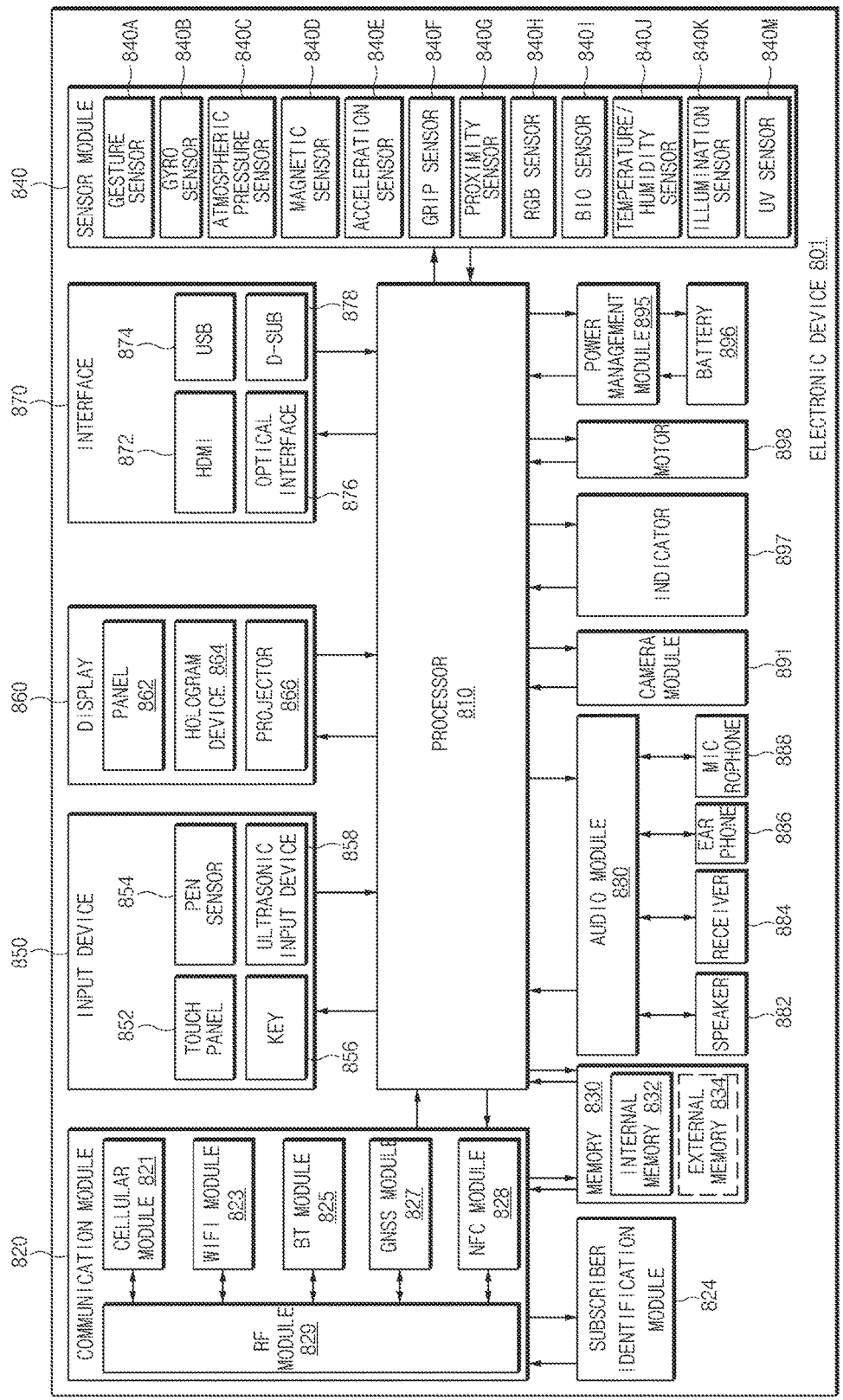
FIG. 8 is a block diagram illustrating an electronic device according to an embodiment of the present disclosure.

FIG. 8 is a block diagram illustrating an electronic device according to an embodiment of the present disclosure.

Referring to FIG. 8, an electronic device 801 may include, for example, a part or the entirety of the electronic device 101 illustrated in FIG. 1. The electronic device 801 may include at least one processor (e.g., AP) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may run an OS or an application program so as to control a plurality of hardware or software elements connected to the processor 810, and may process various data and perform operations. The processor 810 may be implemented with, for example, a system on chip (SoC). According to an embodiment of the present disclosure, the processor 810 may further include a graphic processing unit (GPU) and/or an image signal processor (ISP). The processor 810 may include at least a portion (e.g., a cellular module 821) of the elements illustrated in FIG. 8. The processor 810 may load, on a volatile memory, an instruction or data received from at least one of the other elements (e.g., a nonvolatile memory) to process the instruction or data, and may store various data in a nonvolatile memory.

The communication module 820 may have a configuration that is the same as or similar to that of the communication interface 170 of FIG. 1. The communication module 820 may include, for example, the cellular module 821, a Wi-Fi module 823, a BT module 825, a GNSS module 827 (e.g., a GPS module, a GLONASS module, a BeiDou module, or a Galileo module), an NFC module 828, and a radio frequency (RF) module 829.

The cellular module 821 may provide, for example, a voice call service, a video call service, a text message service, or an Internet service, through a communication network. The cellular module 821 may identify and authenticate the electronic device 801 in the communication network using the subscriber identification module 824 (e.g., a SIM card). The cellular module 821 may perform at least a part of functions that may be provided by the processor 810. The cellular module 821 may include a CP.

Each of the Wi-Fi module 823, the BT module 825, the GNSS module 827 and the NFC module 828 may include, for example, a processor for processing data transmitted/received through the modules. According to some various embodiments of the present disclosure, at least a part (e.g., two or more) of the cellular module 821, the Wi-Fi module 823, the BT module 825, the GNSS module 827, and the NFC module 828, may be included in a single integrated chip (IC) or IC package.

The RF module 829 may transmit/receive, for example, communication signals (e.g., RF signals). The RF module 829 may include, for example, a transceiver, a power amp module (PAM), a frequency filter, a low noise amplifier (LNA), an antenna, or the like. According to another embodiment of the present disclosure, at least one of the cellular module 821, the Wi-Fi module 823, the BT module 825, the GNSS module 827, or the NFC module 828, may transmit/receive RF signals through a separate RF module.

The SIM 824 may include, for example, an embedded SIM and/or a card containing the subscriber identity module, and may include unique identification information (e.g., an integrated circuit (IC) card identifier (ICCID)) or subscriber information (e.g., international mobile subscriber identity (IMSI)).

The memory 830 (e.g., the memory 130) may include, for example, an internal memory 832 or an external memory 834. The internal memory 832 may include at least one of a volatile memory (e.g., a dynamic random access memory (DRAM), a static random access memory (SRAM), a synchronous dynamic random access memory (SDRAM), or the like), a nonvolatile memory (e.g., a one-time programmable read only memory (OTPROM), a programmable read only memory (PROM), an erasable and programmable read only memory (EPROM), an electrically erasable and programmable read only memory (EEPROM), a mask read only memory (ROM), a flash ROM, a flash memory (e.g., a NAND flash memory, a NOR flash memory, or the like)), a hard drive, or a solid state drive (SSD).

The external memory 834 may include a flash drive such as a compact flash (CF), a secure digital (SD), a Micro-SD, a Mini-SD, an extreme digital (xD), a multi-media card (MMC), a memory stick, or the like. The external memory 834 may be operatively and/or physically connected to the electronic device 801 through various interfaces.

The sensor module 840 may, for example, measure physical quantity or detect an operation state of the electronic device 801 so as to convert measured or detected information into an electrical signal. The sensor module 840 may include, for example, at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. Additionally or alternatively, the sensor module 840 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 840 may further include a control circuit for controlling at least one sensor included therein. In some various embodiments of the present disclosure, the electronic device 801 may further include a processor configured to control the sensor module 840 as a part of the processor 810 or separately, so that the sensor module 840 is controlled while the processor 810 is in a sleep state.

The input device 850 may include, for example, a touch panel 852, a (digital) pen sensor 854, a key 856, or an ultrasonic input device 858. The touch panel 852 may employ at least one of capacitive, resistive, IR, and UV sensing methods. The touch panel 852 may further include a control circuit. The touch panel 852 may further include a tactile layer so as to provide a haptic feedback to a user.

The (digital) pen sensor 854 may include, for example, a sheet for recognition which is a part of a touch panel or is separate. The key 856 may include, for example, a physical button, an optical button, or a keypad. The ultrasonic input device 858 may sense ultrasonic waves generated by an input tool through a microphone 888 so as to identify data corresponding to the ultrasonic waves sensed.

The display 860 (e.g., the display 160) may include a panel 862, a hologram device 864, or a projector 866. The panel 862 may have a configuration that is the same as or similar to that of the display 160 of FIG. 1. The panel 862 may be, for example, flexible, transparent, impact-resistant, or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 801. According to an embodiment of the present disclosure, the display 860 may further include a control circuit for controlling the panel 862, the hologram device 864, or the projector 866.

The interface 870 may include, for example, an HDMI 872, a USB 874, an optical interface 876, or a D-subminiature (D-sub) 878. The interface 870, for example, may be included in the communication interface 170 illustrated in FIG. 1. Additionally or alternatively, the interface 870 may include, for example, a mobile high-definition link (MHL) interface, an SD card/multi-media card (MMC) interface, or an IR data association (IrDA) interface.

The audio module 880 may convert, for example, a sound into an electrical signal or vice versa. At least a portion of elements of the audio module 880 may be included in the input/output interface 150 illustrated in FIG. 1. The audio module 880 may process sound information input or output through a speaker 882, a receiver 884, an earphone 886, or the microphone 888.

The camera module 891 is, for example, a device for shooting a still image or a video. According to an embodiment of the present disclosure, the camera module 891 may include at least one image sensor (e.g., a front sensor or a rear sensor), a lens, an ISP, or a flash (e.g., an LED or a xenon lamp).

The power management module 895 may manage power of the electronic device 801. According to an embodiment of the present disclosure, the power management module 895 may include a power management IC (PMIC), a charger IC, or a battery or gauge. The PMIC may employ a wired and/or wireless charging method. The wireless charging method may include, for example, a magnetic resonance method, a magnetic induction method, an electromagnetic method, an acoustic method, or the like. An additional circuit for wireless charging, such as a coil loop, a resonant circuit, a rectifier, or the like, may be further included. The battery gauge may measure, for example, a remaining capacity of the battery 896 and a voltage, current or temperature thereof while the battery is charged or discharged. The battery 896 may include, for example, a rechargeable battery and/or a solar battery.

The indicator 897 may display a specific state of the electronic device 801 or a part thereof (e.g., the processor 810), such as a booting state, a message state, a charging state, or the like. The motor 898 may convert an electrical signal into a mechanical vibration, and may generate a vibration or haptic effect. Although not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 9:
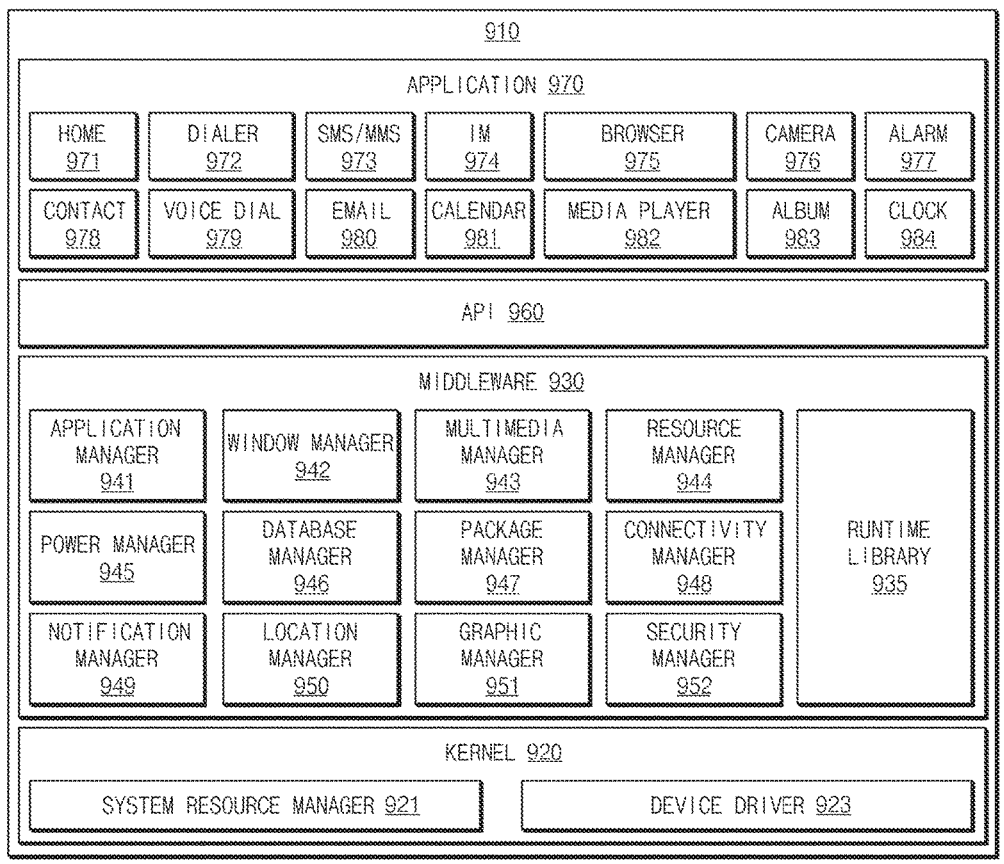
FIG. 9 is a block diagram illustrating a program module according to an embodiment of the present disclosure.

FIG. 9 is a block diagram illustrating a program module according to an embodiment of the present disclosure.

Referring to FIG. 9, a program module 910 (e.g., the program 140) may include an OS for controlling a resource related to an electronic device (e.g., the electronic device 101) and/or various applications (e.g., the application program 147) running on the OS. The OS may be, for example, Android, iOS, Windows, Symbian, Tizen, or the like.

The program module 910 may include a kernel 920, a middleware 930, an API 960, and/or an application 970. At least a part of the program module 910 may be preloaded on an electronic device or may be downloaded from an external electronic device (e.g., the first electronic device 102, the second external electronic device 104, or the server 106).

The kernel 920 (e.g., the kernel 141) may include, for example, a system resource manager 921 or a device driver 923. The system resource manager 921 may perform control, allocation, or retrieval of a system resource. According to an embodiment of the present disclosure, the system resource manager 921 may include a process management unit, a memory management unit, a file system management unit, or the like. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930, for example, may provide a function that the applications 970 require in common, or may provide various functions to the applications 970 through the API 960 so that the applications 970 may efficiently use limited system resources in the electronic device. According to an embodiment of the present disclosure, the middleware 930 (e.g., the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include, for example, a library module that a complier uses to add a new function through a programming language while the application 970 is running. The runtime library 935 may perform a function for input/output management, memory management, or an arithmetic function.

The application manager 941 may mange, for example, a life cycle of at least one of the applications 970. The window manager 942 may manage a GUI resource used in a screen. The multimedia manager 943 may recognize a format required for playing various media files and may encode or decode a media file using a codec matched to the format. The resource manager 944 may manage a resource such as a source code, a memory, or a storage space of at least one of the applications 970.

The power manager 945, for example, may operate together with a basic input/output system (BIOS) to manage a battery or power and may provide power information required for operating the electronic device. The database manager 946 may generate, search, or modify a database to be used in at least one of the applications 970. The package manager 947 may manage installation or update of an application distributed in a package file format.

The connectivity manger 948 may manage wireless connection of Wi-Fi, BT, or the like. The notification manager 949 may display or notify an event such as message arrival, appointments, and proximity alerts in such a manner as not to disturb a user. The location manager 950 may manage location information of the electronic device. The graphic manager 951 may manage a graphic effect to be provided to a user or a user interface related thereto. The security manager 952 may provide various security functions required for system security or user authentication. According to an embodiment of the present disclosure, in the case in which an electronic device (e.g., the electronic device 101) includes a phone function, the middleware 930 may further include a telephony manager for managing a voice or video call function of the electronic device.

The middleware 930 may include a middleware module for forming a combination of various functions of the above-mentioned elements. The middleware 930 may provide a module specialized for each type of an OS to provide differentiated functions. Furthermore, the middleware 930 may delete a part of existing elements or may add new elements dynamically.

The API 960 (e.g., the API 145) which is, for example, a set of API programming functions may be provided in different configurations according to an OS. For example, in the case of Android or iOS, one API set may be provided for each platform, and, in the case of Tizen, at least two API sets may be provided for each platform.

The application 970 (e.g., the application program 147), for example, may include at least one application capable of performing functions such as a home 971, a dialer 972, a short message service (SMS)/multimedia messaging service (MMS) 973, an instant message (IM) 974, a browser 975, a camera 976, an alarm 977, a contact 978, a voice dial 979, an e-mail 980, a calendar 981, a media player 982, an album 983, a clock 984, health care (e.g., measure an exercise amount or blood sugar), or environmental information provision (e.g., provide air pressure, humidity, or temperature information).

According to an embodiment of the present disclosure, the application 970 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 970 may include a specified application (e.g., a healthcare application of a mobile medical device) according to an attribute of the external electronic device (e.g., the first electronic device 102 or the second external electronic device 104). The application 970 may include an application received from an external electronic device (e.g., the first electronic device 102 or the second external electronic device 104). The application 970 may include a preloaded application or a third-party application downloadable from a server. The names of the elements of the program module 910 illustrated may vary with the type of an OS.

According to various embodiments of the present disclosure, at least a part of the program module 910 may be implemented with software, firmware, hardware, or a combination thereof. At least a part of the program module 910, for example, may be implemented (e.g., executed) by a processor (e.g., the processor 810). At least a part of the program module 910 may include, for example, a module, a program, a routine, sets of instructions, or a process for performing at least one function.

According to embodiments of the present disclosure, since there is no need to obtain a policy file associated with a domain of an application from an authentication server, it is easy to set a domain of an application, or it is easy to grant permission to access a secure area to an application assigned to a specific domain.

Further, a variety of effects directly or indirectly understood through this disclosure may be provided.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., compact disc-read only memory (CD-ROM), digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor. For example, the memory may include instructions that, when executed by the processor, cause the processor to receive a request to install or execute an application, determine whether the application is authenticated, generate a policy file associated with a domain of the application if the application is authenticated, and assign the application to a specified domain accessible to a secure area of a memory, based on the generated policy file.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and detail may be made therein without departing from the spirit and scope of the present disclosure as defined by the appended claims and equivalents.

What is claimed is:

1. An electronic device comprising:
   a memory comprising a normal area and a secure area, wherein data stored in the normal area may be shared without security processing while data stored in the secure area is required for the security processing, and wherein the normal area comprises a plurality of domains;
   a communication interface configured to communicate with an external server; and
   at least one processor operatively connected with the memory and the communication interface,
   wherein the at least one processor is configured to:
      control the communication interface to download an application from the external server,
      determine whether the application downloaded from the external server is authenticated by analyzing metadata of the application, in response to receiving an installation request or an execution request of the application,
      in response to determining that the application downloaded from the external server is authenticated, generate a first policy file associated with a domain which is accessible to the secure area among the plurality of domains based on identification information included in the metadata, and
      assign the application downloaded from the external server to the domain, which is accessible to the secure area, based on the generated first policy file and a second policy file which is stored in the memory in advance.

2. The electronic device of claim 1, wherein the at least one processor is further configured to:
   determine whether the application is authenticated further based on authentication information of the application included in the metadata.

3. The electronic device of claim 2, wherein the authentication information of the application is obtained from an authentication server when the application is created.

4. The electronic device of claim 1, wherein the first policy file comprises:
   the identification information assigned based on at least one of signature information and package information of the application.

5. The electronic device of claim 1, wherein the at least one processor is further configured to:
   store the generated first policy file in the memory.

6. The electronic device of claim 1, wherein the at least one processor is further configured to:
   release the application from the domain in response to receiving a request to delete the application.

7. The electronic device of claim 1, wherein the at least one processor is further configured to:
   delete information of the application from the generated first policy file in response to receiving a request to delete the application.

8. A method for processing security of an application, the method comprising:
   downloading, at an electronic device, the application from an external server;
   determining, by the electronic device, whether the application downloaded from the external server is authenticated, by analyzing metadata of the application, in response to receiving an installation request or an execution request of the downloaded application;
   in response to determining that the application downloaded from the external server is authenticated, generating, by the electronic device, a first policy file associated with a domain which is accessible to a secure area of the electronic device based on identification information included in the metadata; and
   assigning, by the electronic device, the application downloaded from the external server to the domain, which is accessible to the secure area, based on the generated first policy file and a second policy file which is stored in a memory of the electronic device in advance,
   wherein the memory of the electronic device comprises a normal area and the secure area, wherein data stored in the normal area may be shared without security processing while data stored in the secure area is required for the security processing, and
   wherein the domain included in the normal area.

9. The method of claim 8, wherein the determining of whether the application is authenticated comprises:
   determining whether the application is authenticated further based on authentication information of the application included in the metadata.

10. The method of claim 8, further comprising:
    storing the generated first policy file in the memory.

11. The method of claim 8, wherein the assigning of the application to the specified domain comprises:
    assigning at least one of an execution code of the application and data that the application uses to the specified domain.

12. The method of claim 8, further comprising:
    releasing the application from the domain in response to receiving a request to delete the application.

13. The method of claim 8, further comprising:
    deleting information of the application from the generated first policy file in response to receiving a request to delete the application.

14. A non-transitory computer-readable recording medium having recorded thereon instructions that, when executed by at least one processor of an electronic device, configure the at least one processor for:
- downloading an application from an external server;
- determining, by the electronic device, whether the application downloaded from the external server is authenticated, by analyzing metadata of the application, in response to receiving an installation request or an execution request of the downloaded application;
- in response to determining that the application downloaded from the external server is authenticated, generating, by the electronic device, a first policy file associated with a domain which is accessible to a secure area of the electronic device based on identification information included in the metadata; and
- assigning, by the electronic device, the application downloaded from the external server to the domain, which is accessible to the secure area, based on the generated first policy file and a second policy file which is stored in a memory of the electronic device in advance,
- wherein the memory of the electronic device comprises a normal area and the secure area, wherein data stored in the normal area may be shared without security processing while data stored in the secure area is required for the security processing, and
- wherein the domain included in the normal area.

* * * * *